(12) United States Patent
Bin (10) Patent No.: US 10,657,180 B2
(45) Date of Patent: May 19, 2020

(54) BUILDING AND REUSING SOLUTION CACHE FOR CONSTRAINT SATISFACTION PROBLEMS

(71) Applicant: INTERNATIONAL BUSINESS MACHINES CORPORATION, Armonk, NY (US)

(72) Inventor: Eyal Bin, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1232 days.

(21) Appl. No.: 14/931,954

(22) Filed: Nov. 4, 2015

(65) Prior Publication Data
US 2017/0124456 A1 May 4, 2017

(51) Int. Cl.
*G06N 5/00* (2006.01)
*G06F 16/901* (2019.01)

(52) U.S. Cl.
CPC ......... *G06F 16/9027* (2019.01); *G06N 5/003* (2013.01)

(58) Field of Classification Search
None
See application file for complete search history.

(56) References Cited

U.S. PATENT DOCUMENTS

| 4,821,220 A | * | 4/1989 | Duisberg | G06F 3/04895 345/473 |
| 5,452,238 A | * | 9/1995 | Kramer | G06F 17/5086 345/419 |
| 5,666,469 A | * | 9/1997 | Lee | G06Q 10/04 706/45 |
| 5,819,210 A | * | 10/1998 | Maxwell, III | G06F 8/3135 704/9 |

(Continued)

FOREIGN PATENT DOCUMENTS

WO 2009152180 A2 12/2009

OTHER PUBLICATIONS

Jia, X. et al. (Jan. 28, 2015). "Enhancing Reuse of Constraint Solutions to Improve Symbolic Execution". arXiv:1501.07174v1 [cs.SE] Jan. 28, 2015 (Year: 2015).*

(Continued)

*Primary Examiner* — Kamran Afshar
*Assistant Examiner* — Benjamin J Buss
(74) *Attorney, Agent, or Firm* — Cantor Colburn LLP; Joseph Petrokaitis (57) ABSTRACT

Technical solutions are described for reusing a solution for a test. An example method includes building, by a processor, a solution cache including a tree structure representative of a plurality of solutions, which stores a key configurable immediate value of a previous solution as a node, the previous solution as a leaf node of the tree, and an edge from the node indicative of a value of the key configurable (Continued)

immediate value at the node. The method includes traversing nodes of the tree structure in the solution cache to identify key configurable immediate values of a previous solution identical to configurable immediate values from the test by identifying edges associated values identical to those from the test. In response to reaching a leaf node of the tree structure, using the solution(s) at the leaf node as a solution of the test.

20 Claims, 5 Drawing Sheets

(56) References Cited

U.S. PATENT DOCUMENTS

| | | | | |
|---|---|---|---|---|
| 5,822,593 | A * | 10/1998 | Lamping | G06F 8/30 717/161 |
| 6,154,156 | A * | 11/2000 | Tagato | H04L 29/06 341/78 |
| 6,397,383 | B1 * | 5/2002 | Chang | G06F 8/427 707/999.003 |
| 6,697,826 | B1 * | 2/2004 | Kumar | G06F 16/289 |
| 6,728,665 | B1 * | 4/2004 | Gupta | G06F 17/504 703/2 |
| 7,225,121 | B2 * | 5/2007 | Maxwell, III | G06F 17/2775 704/9 |
| 8,150,787 | B2 | 4/2012 | Maturana | |
| 8,984,464 | B1 * | 3/2015 | Mihal | G06F 17/5072 716/118 |
| 2001/0014875 | A1 * | 8/2001 | Young | G06Q 40/00 705/37 |
| 2002/0169587 | A1 * | 11/2002 | Emek | G06F 17/10 703/2 |
| 2004/0068487 | A1 * | 4/2004 | Barton | G06F 17/2247 |
| 2004/0133672 | A1 * | 7/2004 | Bhattacharya | H04L 63/1416 709/224 |
| 2005/0240651 | A1 * | 10/2005 | Govindarajan | G06F 9/465 709/200 |
| 2007/0260333 | A1 * | 11/2007 | Peureux | F17D 1/04 700/28 |
| 2009/0125766 | A1 * | 5/2009 | Safarpour | G06F 17/504 714/724 |
| 2009/0259454 | A1 * | 10/2009 | Adir | G06F 11/263 703/17 |
| 2009/0327177 | A1 * | 12/2009 | Kirovski | G06F 17/11 706/13 |
| 2010/0017352 | A1 * | 1/2010 | Maturana | G06N 5/003 706/46 |
| 2010/0199257 | A1 * | 8/2010 | Biggerstaff | G06F 8/456 717/104 |
| 2010/0262574 | A1 * | 10/2010 | Zhou | G06N 5/02 706/50 |
| 2011/0116381 | A1 * | 5/2011 | Nikander | H04L 63/08 370/236 |
| 2011/0282820 | A1 * | 11/2011 | Vasudevan | G06N 5/00 706/47 |
| 2013/0104175 | A1 * | 4/2013 | Applegate | H04N 21/231 725/87 |
| 2013/0191317 | A1 * | 7/2013 | Perron | G06N 5/00 706/50 |
| 2013/0196305 | A1 * | 8/2013 | Adir | G09B 5/00 434/322 |
| 2014/0067356 | A1 * | 3/2014 | Goswami | G06F 11/263 703/14 |
| 2014/0173135 | A1 * | 6/2014 | Varney | H04L 41/0893 709/245 |
| 2014/0282586 | A1 * | 9/2014 | Shear | G06F 9/5072 718/104 |
| 2014/0344453 | A1 * | 11/2014 | Varney | H04L 41/0803 709/224 |
| 2015/0178625 | A1 * | 6/2015 | Berlandier | G06Q 10/0637 706/11 |
| 2015/0269124 | A1 * | 9/2015 | Hamze | G06F 17/18 703/2 |
| 2015/0309813 | A1 * | 10/2015 | Patel | G06F 8/75 703/22 |
| 2016/0259851 | A1 * | 9/2016 | Hopkins | G06F 17/2725 |
| 2017/0140072 | A1 * | 5/2017 | Sidorenko | G06F 17/11 |

OTHER PUBLICATIONS

Kumar, V. (1992). "Algorithms for Constraint-Satisfaction Problems: A Survey". AI Magazine, vol. 13, No. 1, pp. 32-44. (Year: 1992).*
Miguel, I. et al. (2000). "Dynamic Flexible Constraint Satisfaction". Applied Intelligence 13, 231-245, 2000. (Year: 2000).*
Teige, T. et al. (2011). "Constraint-based analysis of concurrent probabilistic hybrid systems: An application to networked automation systems". Nonlinear Analysis: Hybrid Systems, 5(2), 343-366. DOI:10.1016/j.nahs.2010.04.009 (Year: 2011).*
Wallace, R.J. et al. (1998). "Stable Solutions for Dynamic Constraint Satisfaction Problems". 15 pages. (Year: 1998).*
Atkin, J.A. et al. (2008). "On-line decision support for take-off runway scheduling with uncertain taxi times at London Heathrow airport". Journal of Scheduling, 11(5), 323. DOI:10.1007/s10951-008-0065-9 (Year: 2008).*
Hebrard, E. (2007). "Robust Solutions for Constraint Satisfaction and Optimisation under Uncertainty". PhD Thesis. The University of New South Wales. 234 pages. (Year: 2007).*
Russell, S.J. et al. (2003). "Chapter 5: Constraint Satisfaction Problems" in Artificial Intelligence: A Modern Approach, Second Edition, Prentice Hall. pp. 137-160. (Year: 2003).*

* cited by examiner

BUILDING AND REUSING SOLUTION CACHE FOR CONSTRAINT SATISFACTION PROBLEMS

BACKGROUND

The present application relates to building a solution cache for constraint satisfaction problems such as generating test cases, and more specifically, to reusing a previous solutions that are cached in response to receiving a constraint satisfaction problem.

A test case is typically modeled as a Constraint Satisfaction Problems (CSP), which is defined as a set of objects whose state must satisfy a number of constraints or limitations. Typically, finding a solution to the CSP is complex, requiring a combination of heuristics and combinatorial search methods, which is computationally intensive and time consuming.

SUMMARY

According to an embodiment, a computer implemented method for reusing a solution for a test includes building, by a processor, a solution cache including a tree structure representative of a plurality of solutions, the tree structure including a key configurable immediate value of a previous solution as a node, the previous solution as a leaf node of the tree, and an edge from the node indicative of a value of the key configurable immediate value at the node. In response to receiving the test for which a solution is to be determined, configurable immediate values in the test are determined. The computer implemented method also includes traversing to a first node of the tree structure in the solution cache, the first node including the key configurable immediate value of the previous solution identical to a configurable immediate value from the test. The computer implemented method also includes identifying an edge of the tree structure from the first node, the edge being associated with a value identical to a value of the configurable immediate value from the test. The computer implemented method also includes traversing to a next node of the tree structure along the edge. The computer implemented method also includes in response to the next node being a leaf node of the tree structure, using the solution(s) at the leaf node as a solution of the test.

According to another embodiment, a system for reusing a solution of a constraint satisfaction problem as a solution for a test includes a memory and a processor. The memory stores a solution cache, where the solution cache includes a tree structure representative of a plurality of solutions, the tree structure including intermediate nodes and leaf nodes, each intermediate node corresponding to a key configurable immediate value of a previous solution, and each leaf node corresponding respective previous solutions, and an edge from the intermediate node indicative of a value of the key configurable immediate value at the intermediate node. The processor identifies, from the previous solutions in the solution cache, a solution to be reused for the test by: determining configurable immediate values in the test; traversing to a first intermediate node of the tree structure in the solution cache, the key configurable immediate value of the previous solution at the first intermediate node identical to a first configurable immediate value from the test; identifying an edge of the tree structure from the first intermediate node, the edge being associated with a value identical to a value of the first configurable immediate value from the test; traversing to a next node of the tree structure along the edge; and in response to the next node being a leaf node of the tree structure, reuse the previous solution(s) at the leaf node as a solution of the test.

According to yet another embodiment, a computer program product for reusing a solution from a solution cache includes computer readable storage medium. The computer readable storage medium includes computer executable instructions to build a solution cache, where the solution cache includes a tree structure representative of a plurality of solutions, the tree structure including intermediate nodes and leaf nodes, each intermediate node corresponding to a key configurable immediate value of a previous solution, and each leaf node corresponding respective previous solutions, and an edge from the intermediate node indicative of a value of the key configurable immediate value at the intermediate node. The computer readable storage medium further comprises instructions to, in response to receipt of a test for which a solution is to be determined, identify a solution to be reused from the solution cache. To this end, the computer readable storage medium includes instructions to determine configurable immediate values in the test; traverse to a first node of the tree structure in the solution cache, the key configurable immediate value of the previous solution at the first intermediate node identical to a first configurable immediate value from the test; identify an edge of the tree structure from the first intermediate node, the edge being associated with a value identical to a value of the first configurable immediate value from the test; traverse to a next node of the tree structure along the edge; and in response to the next node being a leaf node of the tree structure, reuse the previous solution(s) at the leaf node as a solution of the test.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

A Constraint Satisfaction Problem (CSP), P=<V, D, C> is defined as a set of variables, V={$v_1$, ..., $v_n$}, which take discrete values from their corresponding finite domains D={$Dv_1$, ..., $Dv_n$}, and a set of constraints C={$C_1$, ..., $C_m$}. All sets are finite. A constraint is an entity that restricts the values of the variables it involves. A constraint may use "immediate values" that are treated as constants in the problem. A solution to the CSP is a single assignment of each variable such that the value of the variable belongs to the corresponding domain, and all the constraints are satisfied.

Typically, upon receipt of a new CSP that differs from a previous CSP by the immediate values, and is similar in other aspects, finding a solution to the new CSP starts from scratch. The technical solutions described herein facilitate identifying a previous solution from a solution cache without solving the new CSP. The typical approach of build and solving a new CSP from scratch is expensive in run-time since solving a CSP is known to be NP Hard. Building and solving a CSP, typically includes heuristics methods, local repair methods, and constraints recording. Thus, since finding a solution to a CSP is complex, and requires a combination of heuristics and combinatorial search methods, which is computationally intensive and time consuming, the technical solutions described herein enhance a CSP solution system.

Another typical approach to build and solve a new CSP is to build the new CSP, populate its variables with the values of the previous solution, and validate that all the constraints are satisfied. Such an approach is also expensive in run-time since the required time is linear in the number of constraints. Thus, when the number of constraints is a large number, such as hundreds, thousands, or more, such an approach can consume a long duration of time.

The technical solutions described herein, identify a solution to a new CSP without heuristics, by identifying and inferring a solution for the new CSP based on a solution for a previous CSP. The technical solutions infer the previous solution as being a solution for the new CSP without validating all the constraints. Since heuristics are not used, the technical solutions herein reduce the computational intensity, and hence the time required to identify a solution for the new CSP. Further, since the previous solution, which already exists, is being used as the new solution, stability of the CSP solution system is improved as it is known that the previous solution can successfully be executed. Thus, the technical solutions described herein improve the efficiency and the stability of the CSP solution system.

Figure 1:
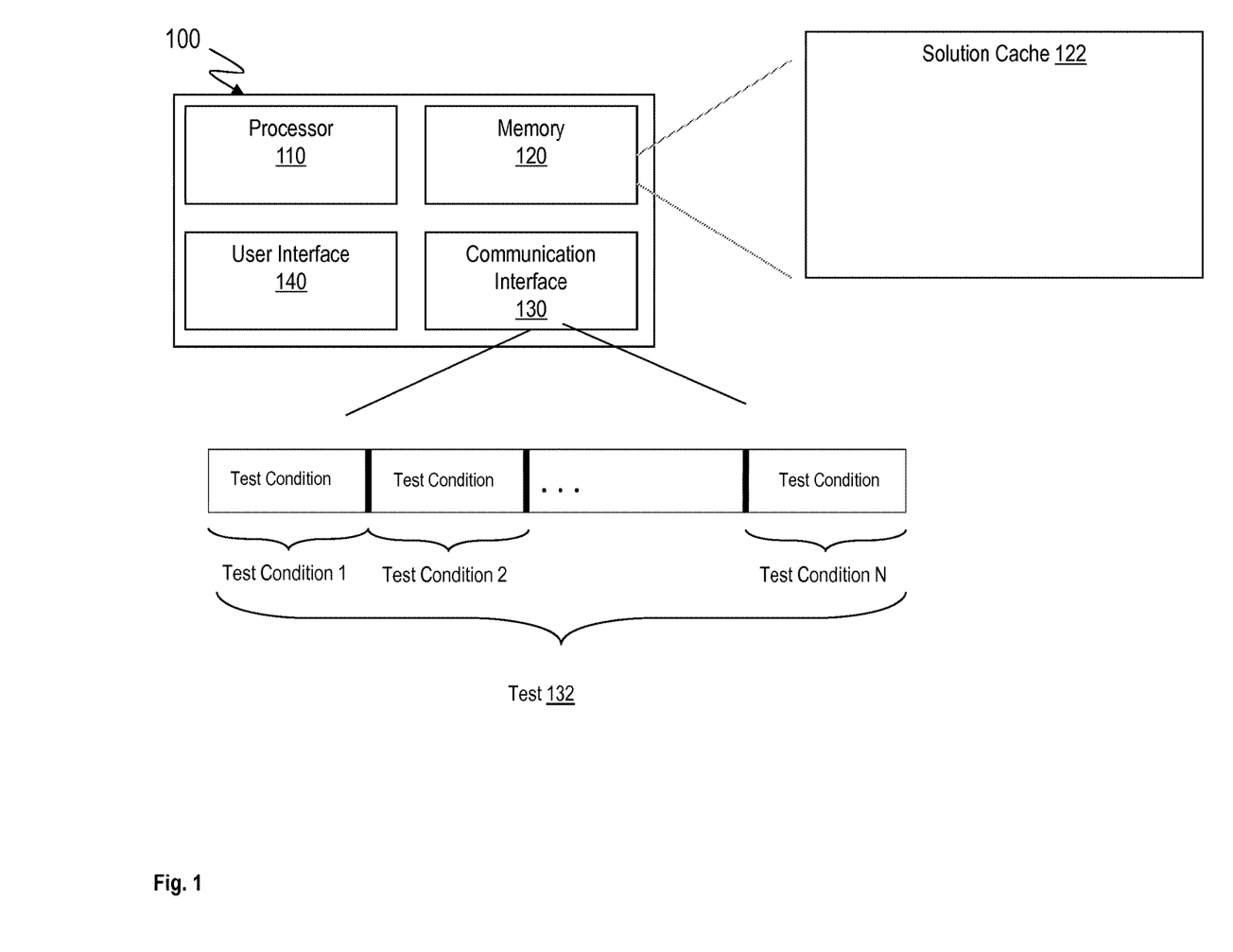
FIG. 1 illustrates an example testing system in accordance with an embodiment.

FIG. 1 illustrates an example testing system 100. The testing system includes a processor 110, a memory 120, a communication interface 130, and a user interface 140, among other components. The processor 110 may be a central processor of the testing system responsible for execution of an operating system, control instructions, and applications installed on the testing system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120 and other components of the testing system 100.

The memory 120 may be non-transitory computer storage medium. The memory 120 may be DRAM, SRAM, Flash, or any other type of memory or a combination thereof. The memory 120 may store control instructions and applications executable by the processor 110. The memory 120 may contain other data such as images, videos, documents, spreadsheets, audio files, and other data that may be associated with operation of the testing system 100. The memory includes a solution cache 122. The solution cache 122 contains a cache of solutions (or results) of previous CSPs that have been processed by the testing system 100.

The communication interface 130 facilitates the testing system 100 to receive and transmit data. The communication interface 130 facilitates wired and/or wireless. For example, the communication interface 130 facilitates communication in other manners, such as via communication ports like Universal Serial Bus™ (USB), Ethernet, Thunderbolt™, or any other communication ports. For example, the communication interface 130 receives a test 132, which is to be modelled as a new CSP. The test 132 may be to test performance and/or quality of a product. For example, the test 132 may be part of a pool of quality assurance tests that the product undergoes. The product may be hardware, software, consumer product, pharmaceutical, or any other product or a combination thereof. For example, the product may be an electronic circuit, such as a chip. Alternatively, the product may be a medical device. Alternatively, the product may be a software application that is executed on a computer system, such as a server, a desktop, a tablet, a laptop, a phone, or any other computer system. Alternatively, the product may be an automobile part, or an automobile itself. Alternatively, the product may be one of several consumer goods such as a food item, a beverage, a health product, a cleaning agent, or any other consumer good. Thus, the product that is to be tested may be any product that is now in use or may be in use in the future.

The processor 110 stores the solutions of a previous CSP in a manner that facilitates identifying a solution for a new CSP, such as the new CSP corresponding to the test 132. The processor 110 identifies and stores key immediate values that were important to the previous CSP solution. When identifying a previous solution from the solution cache 122 for the new CSP, the processor 110 determines if the key values have the same value in the previous CSP solution and the new CSP. The processor 110 thus, identifies the previous solution as being a solution to the new CSP without solving the new CSP, even when some immediate values were changed, thus avoiding the compute expensive heuristics and validation.

The user interface 140 may include a display, a speaker, a vibration controller, a light emitting device (such as a light emitting diode), or any other component. The display may be touch screen enabled. The user interface 140 may include more or fewer devices than those shown and listed. For example, the user interface 140 may, alternatively, or in addition, include an antenna, a microphone, a case, or any other component that may enable user interaction. The user interface 140 may be circuitry, such as processor, memory, communication interfaces, integrated circuits, antennas, resistors, capacitors, and any other hardware components. The user interface 140 may also involve software. For example, the user interface 140 may involve instructions and/or data that may be stored on memory. The instructions and/or data may control operations of the user interface 140. The instructions may be computer executable.

The testing system 100 further includes hardware components that the processor 110 uses to build and solve test cases in response to receiving the test 132. For example, the testing system 100 may include input/output peripherals such as keyboard and mouse. Alternatively or in addition, the testing system 100 includes human interaction components such as display and audio input/output circuitry. Alternatively or in addition, the testing system 100 includes computational devices such as graphics processing unit (GPU), arithmetic unit (AU), or any other co-processor.

The test 132 includes one or more test conditions that are used as constraints when building the CSP corresponding to the test 132. A test condition can be expressed in one of several manners. For example, the test condition may include an explicit enumeration of tuples that satisfy a constraint that is the test condition. The width of the tuple is the arity of the constraint. For example, {{2, 1}, {3, 1}, {3, 2}} is a constraint with arity 2, that enables three combinations of values for two variables that are involved in the test condition. In another example, the test condition is expressed as a mathematical expression composed of variables, operators, constants (that is immediate values), and connectives as in first-order logic. This provides a way to construct complex constraints by forming expressions over atomic (elementary) constraints and composition operands such as 'and' (conjunction), 'or' (disjunction), and 'imply' (→). An example of such a constraint would be "a=b→c>3" where a, b, and c are the variables and a=b,c>3 are two atoms connected with a conjunction operator. This representation is useful when the domain of the variables is large.

The testing system 100, in an example, transforms the test conditions in the test 132 into this representation. The constant values (or immediate values) can be represented as values such as the number 3, or by an immediate value represented by its name. The name of the constant is converted to its value at build time of the CSP. For example, consider a test condition (or constraint) a=(b>7?C1:C2+1) where a, b are variables and C1,C2 are immediate values. The immediate values are determined when the CSP is built. The immediate values are constant values during the solving of the CSP. The value of C1 and C2 can be different when solving another CSP. The value '1' is a real permanent constant. In the above example, the semantics of the expression represent that if 'b' is greater than 7, then 'a' should be equal to C1, otherwise 'a' should be equal to result of C2+1. Different CSPs may use different values for C1 and/or C2, thus leading to different solutions.

Figure 2:
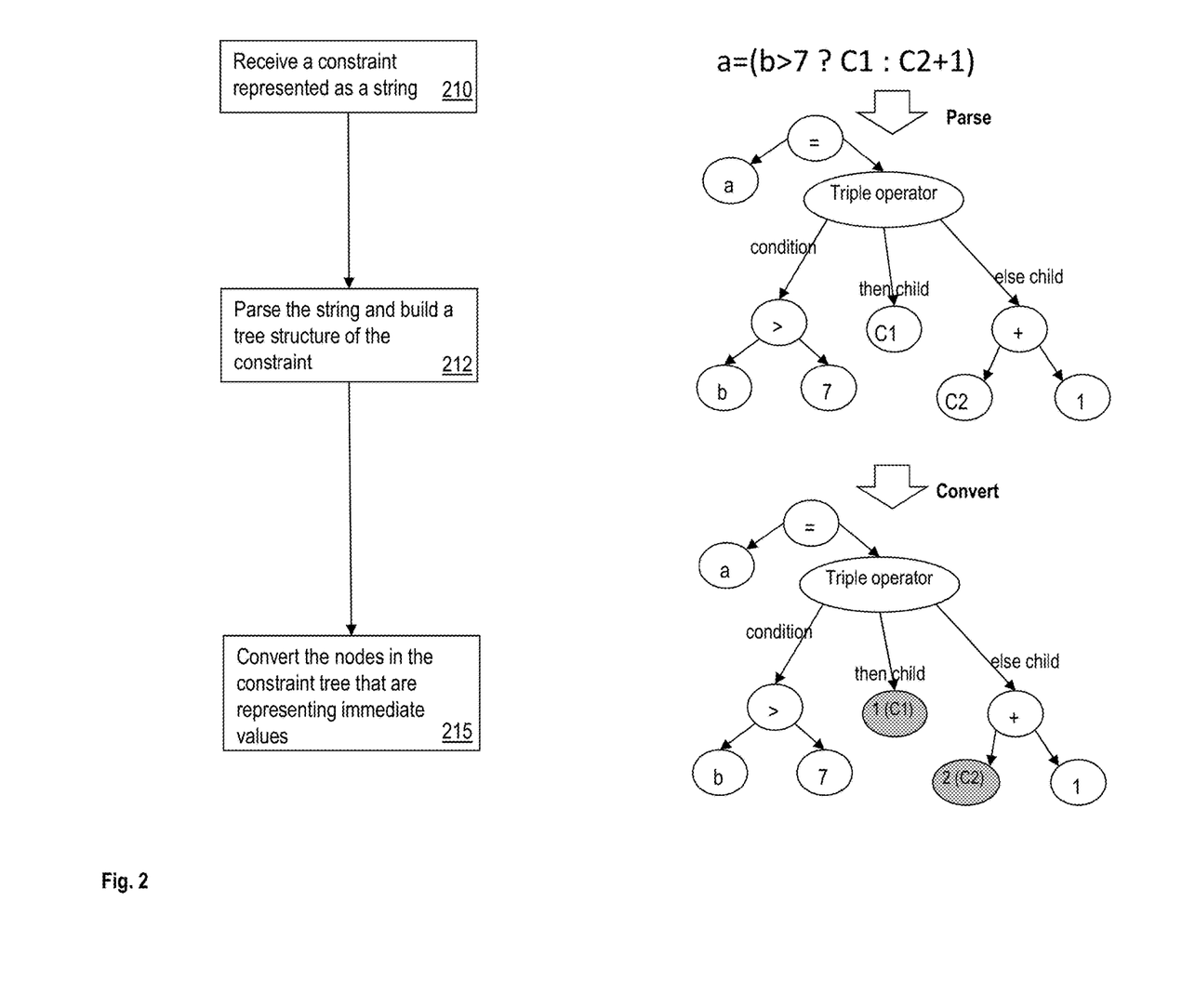
FIG. 2 illustrates a flowchart and an example of converting a constraint into a tree structure in accordance with an embodiment.

FIG. 2 illustrates a flowchart and an example of converting a constraint into a tree structure. The testing system 100 receives a constraint that is part of the test 132 via the communication interface 130, as shown at block 210. The constraint may be a string that includes variables and constraints represented by operators and immediate value names, such as the above example of "a=(b>7?C1:C2+1)." The processor 110 parses the constraint string to build a tree structure, as shown at block 212. The tree structure includes a node for each operator in the constraint string with the variables, immediate values, and/or constants child nodes from the operator. A conditional operator, such as '?' in this example, has the condition, and the 'then child' and 'else child' as children nodes, as illustrated in FIG. 2. The processor 110 further determines the values for the immediate value nodes for the constraint. Assume that the value of C1 is 1 and the value of C2 is 2. The processor 110 converts the tree structure using the immediate values, as shown at block 215, and illustrated in the example.

The processor 110 solves the CSP and then identifies which of the immediate values in the CSP are relevant to the solution and uses those immediate values as a key when storing the solution in the solution cache 122. The CSP contains multiple such constraints. Thus, the testing system 100 generates the CSP corresponding to the test 132 using the various test conditions as the constraints in the CSP and identifies the immediate values that are representative of a 'key' for the CSP.

In an example, the processor 110 identifies the key immediate values by iterating over all the constraints in the CSP, once a solution to the CSP is determined. To facilitate the iteration, the processor 110 maintains the CSP solution in the solutions cache 122. The processor 110, when storing the CSP solution in the solutions cache 122, marks the immediate values that are part of the key for the CSP solution, and further ensures not to mark immediate values that are not part of the key, since irrelevant immediate values may create a mismatch with the new CSP.

In an example, the processor 110 maintains the solutions cache 122 as a tree in which the internal nodes represent names of immediate values (or constants), the edges between the nodes represent the immediate values that the constraints of the CSP have, and the leaf nodes represent the CSP solutions. When an immediate value is irrelevant to the current solution, but was relevant in a previous CSP, the immediate value is made part of the tree. In this case, a predetermined value, such as 'NULL' is associated with the immediate to represent that it is irrelevant to the current solution. In an example, the nodes in the tree are sorted in alphabetic order according to the names of the immediate values.

Figure 3:
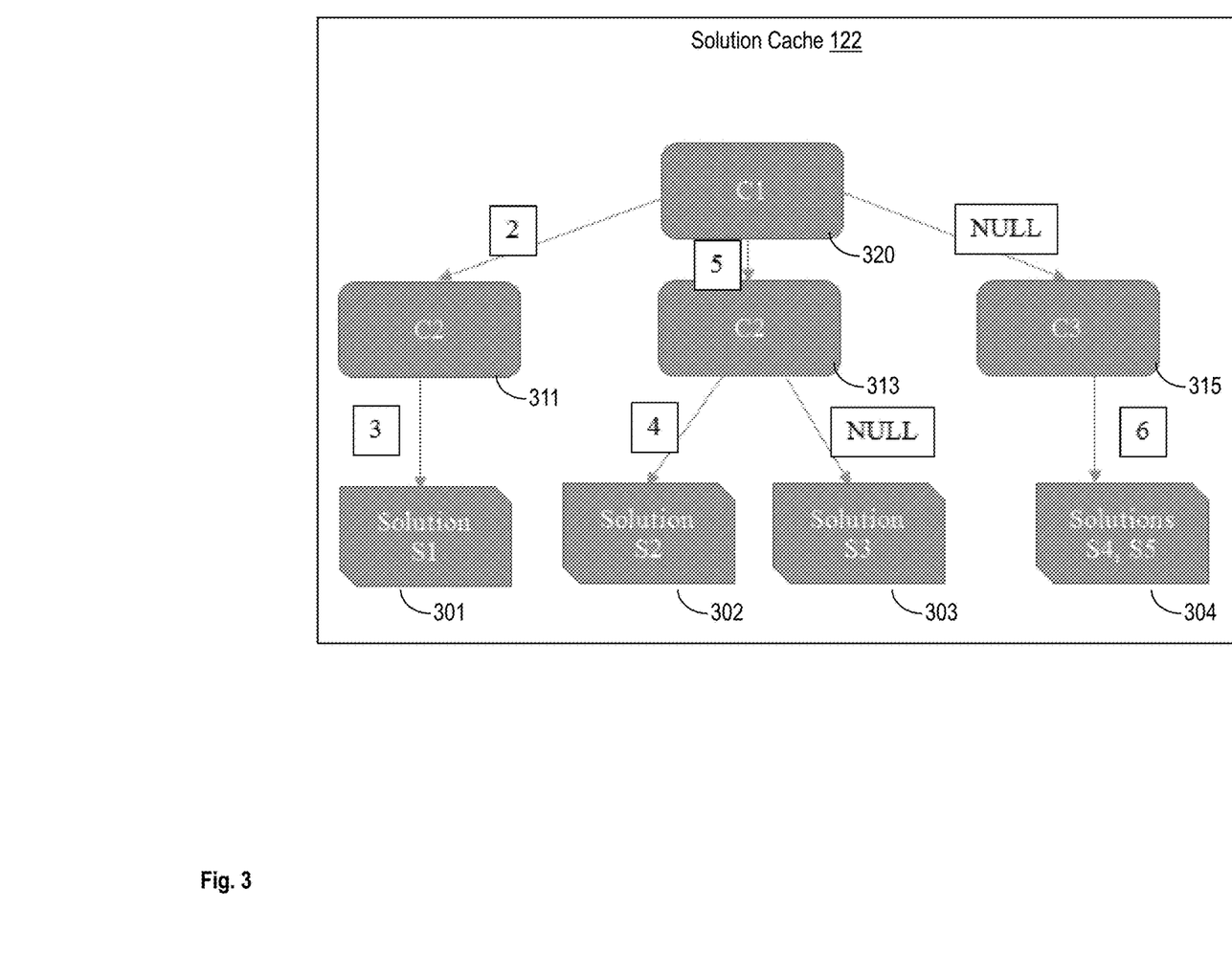
FIG. 3 illustrates an example solution cache in accordance with an embodiment.

FIG. 3 illustrates an example solution cache 122 containing five CSP solutions {S1, S2, S3, S4, S5}. The key of S1 301 includes the immediate values C1 320, C2 311. The key of S2 302 includes the immediate values C1 320, C2 313. The key of S3 303 includes the immediate values C1 320, C2 313. The key of S4 and S5 304 includes the immediate values C1 320, C3 315. For S1 301, C1=2 and C2=3, and C3 is not a part of S1. For Solution S2 302, C1=5, and C2=4. For Solution S3 303, C1=5, and C2 is irrelevant. Hence the edge from C2 in this case is associated with the predetermined value 'NULL'. For Solutions S4 and S5 304, C3=6 and C1 is irrelevant, as indicated by the 'NULL' from C1 320.

Figure 4:
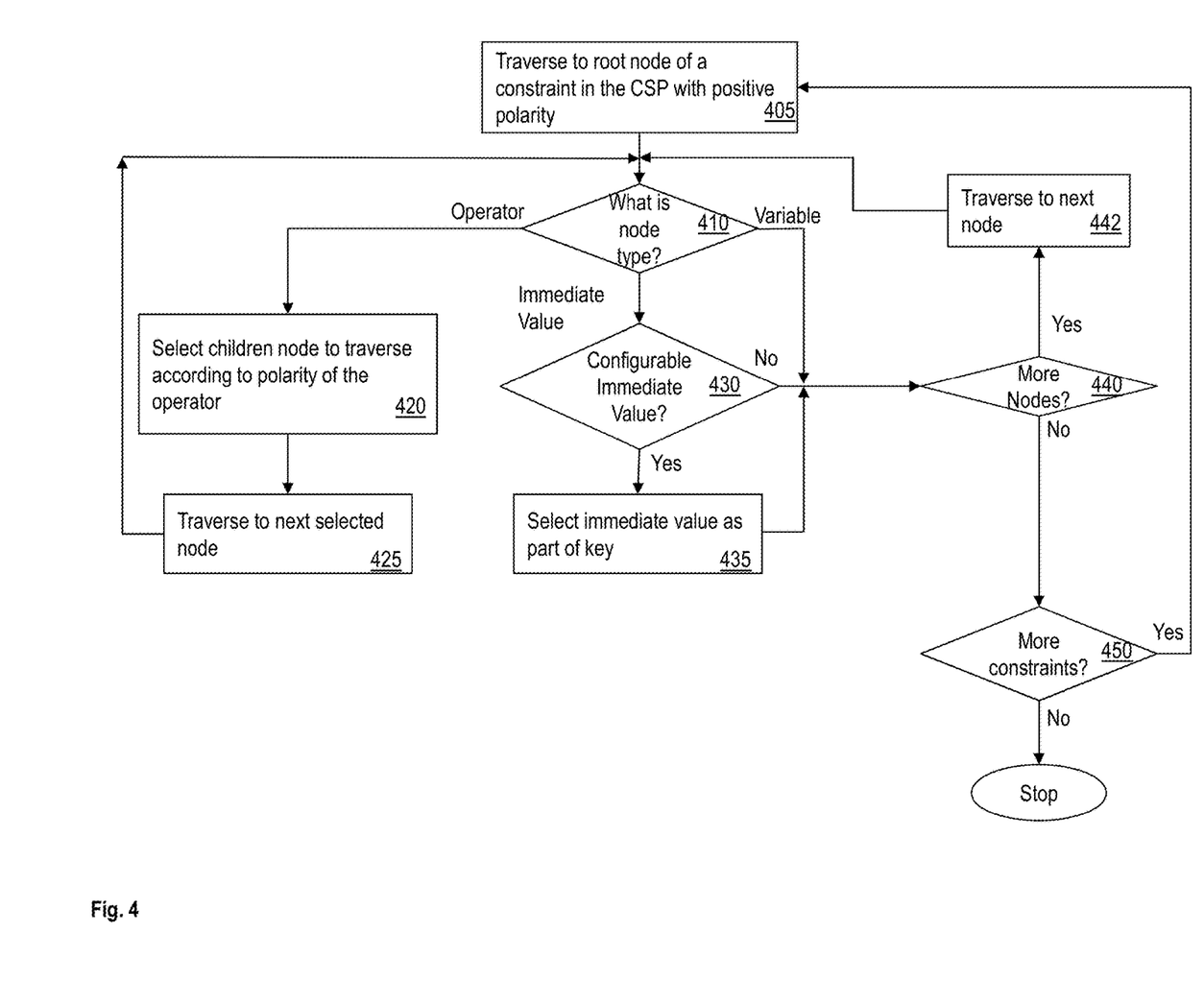
FIG. 4 illustrates a flowchart of example logic to identify the key immediate values in a CSP solution in accordance with an embodiment.

FIG. 4 illustrates a flowchart of example logic to identify the key immediate values in a CSP solution. The processor 110 implements the process to identify the key immediate values. In each constraint in the CSP solution, the processor 110 starts in the root of the constraint with positive polarity, as shown at block 405. A node with a positive polarity indicates that a condition represented by the node has been satisfied and that at least one of the children nodes of the root node have been identified as part of the solution for the CSP. For example, if the root node represents a 'conjunction' operator (AND) with positive polarity, the processor 110 continues with all children nodes of the node, as all the children nodes have to be positive for the conjunction operator to have a positive polarity. Alternatively, if the node represents a 'disjunction' operator (OR), which has a positive polarity, the processor 110 continues only to the children nodes of the node that are satisfied for the disjunction to be satisfied. In yet another example, if the root node represents the triple operator from the earlier example a=(b>7?C1:C2+1) with positive polarity, the processor 110 continues to the condition child together with just one child according to the value of the condition. In this example, if b is greater than 7, C1 will be identified as part of the key and otherwise, C2 will be identified as part of the key.

Table 1 illustrates the selection of the key immediate values based on the node, represented operators, and corresponding polarities (in case the node represents an operator). The processor 110 determines the type of the node that it is currently traversing, as shown at block 410. The node may be an operator (such as node for the triple operator in FIG. 2), an immediate value (such as node for 'C1' in FIG. 2), or a variable in the constraint (such as node 'b' in FIG. 2.). In case the operator is a variable, the processor 110 does not modify the key of the CSP solution, and continues to traverse a next node in the constraint tree, if there are more nodes, as shown at blocks 440 and 442. If the constraint tree does not have any more nodes, the processor 110 continues to traverse a next constraint in the CSP, if there are additional constraints, as shown at blocks 450 and 405.

In case the node represents an operator, the processor 110 selects the next nodes to traverse based on the polarity of the operator, as described in Table 1, and as shown at block 420. The processor 110 continues to traverse the children nodes of the operator that are selected, as shown at block 425.

TABLE 1

| Node Type | Symbol | Positive polarity | Negative polarity |
|---|---|---|---|
| And | && | Traverse all the children (same polarity) | Continue with the non-satisfied children (same polarity) |
| Or | \|\| | Traverse the satisfied children (same polarity) | Traverse the not-satisfied children (same polarity) |
| not | ! | Traverse the child (negative polarity) | Traverse the (positive polarity) |
| Imply | -> | If the prefix child is satisfied, traverse both children (if positive polarity) otherwise, traverse the prefix child (negative polarity) | Traverse the prefix child (positive polarity). Else, traverse the suffix child (negative polarity) |
| Logical operations | =, !=, >, >=, <, <= | Traverse all the children (positive polarity) | N/A |
| Arithmetic operators | +, −, *, /, . . . | Traverse all the children (positive polarity) | N/A |
| Triple operator | ? : | If the condition child is satisfied, traverse the condition child (positive polarity) and the 'then' child (positive polarity) otherwise, traverse the condition child (negative polarity) and the 'else child (positive polarity) | N/A |
| Immediate value (having a name) | | Select this immediate value. | N/A |
| Immediate value with no name | | None | N/A |
| A CSP variable | | None | N/A |

Else, if the node currently being traversed represents an immediate value, the processor 110 determines if the immediate value is configurable, as shown at block 430. The immediate value is configurable if it has a name associated with it in the constraint. In other words, the immediate value being associated with a name is indicative that the immediate value is configurable, and not a non-configurable constant value. For example, in the earlier case of a=(b>7?C1:C2+1), C1 and C2 are immediate values with names, values of which are configurable; while '7' is an immediate value without a name (a direct constant) and which is not configurable.

If the immediate value is not configurable, the processor 110 does not select the immediate value as part of the key for the CSP solution, and the processor 110 continues to traverse next nodes, as shown at blocks 430 and 440. Alternatively, if the immediate value is configurable, the processor 110 selects the immediate value as part of the key for the CSP solution, and continues to traverse any additional nodes of the constraint, as shown at blocks 435 and 440.

Accordingly, processor 110 selects the key of the CSP solution, based on the traversal of the CSP solution from the solution cache 122. The key includes the configurable immediate values in the one or more constraints that are included in the CSP. Further, as illustrated in FIG. 3, the processor 110 keeps track of the values of the configurable immediate values that lead the CSP solution to be satisfied. As described, the processor 110 associates the configured values with the edges from the nodes representing the configurable immediate values in the constraint tree structure in the solution cache 122.

Figure 5:
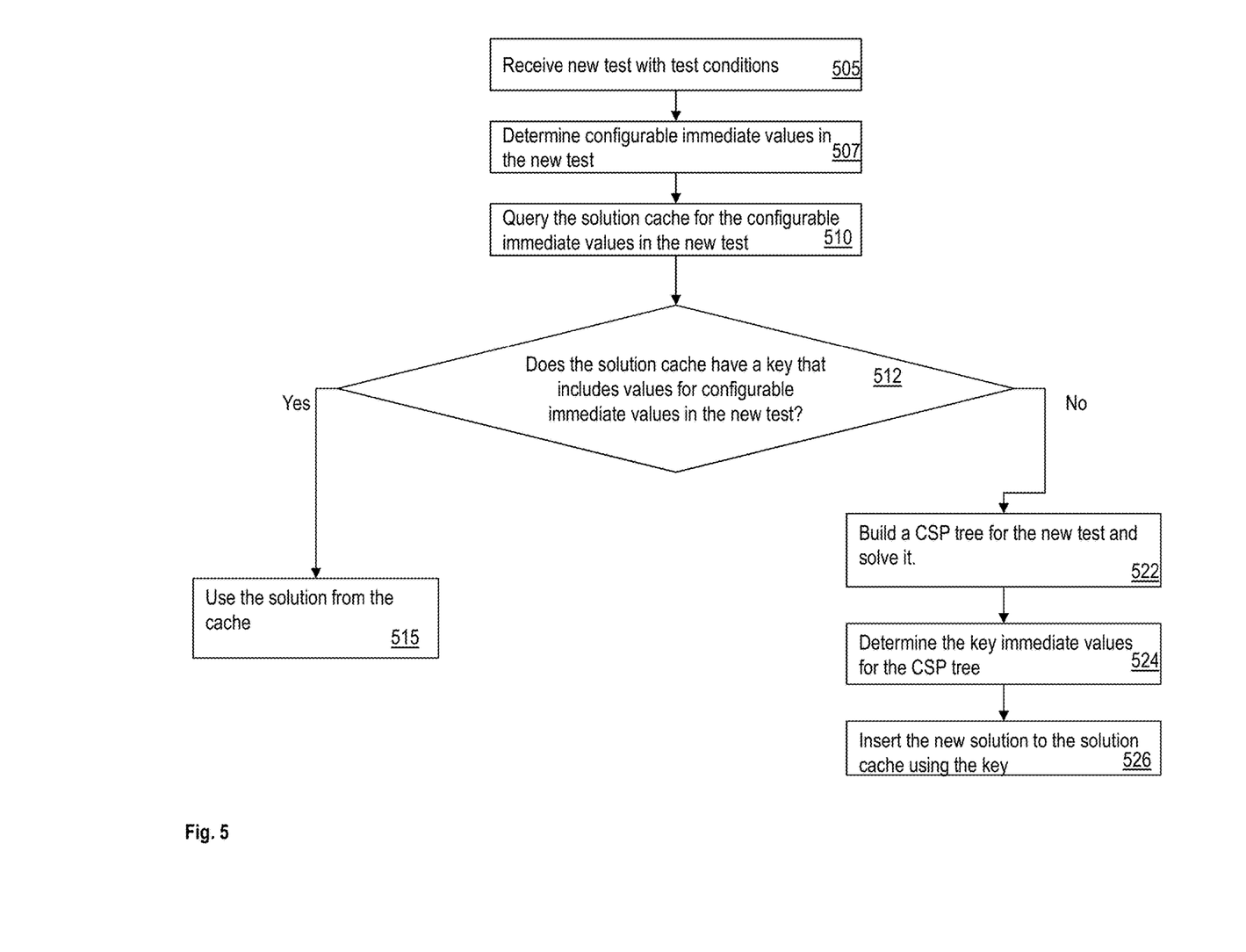
FIG. 5 illustrates a flowchart of selecting a solution from the solution cache for reuse in accordance with an embodiment.

The processor 110 determines if one of the solutions that are stored in the solution cache solves the test 132 that is received, thus avoiding the computations involving to build a CSP for the test 132 and further to solve the CSP. FIG. 5 illustrates a flowchart of selecting a solution from the solution cache 122 for a new test. The processor 110 implements the process for selecting the solution from the solution cache 122. Upon receipt of the test 132 that is to be modelled as a CSP, the processor determines the values of the configurable immediate values in the test conditions of the test 132, as shown at blocks 505 and 507. The processor 110 traverses the tree of solutions stored in the solution cache 122, to determine if an existing solution in the solution cache 122 has a key that includes the configurable immediate values as the new test, as shown at block 510. For example, if the test 132 includes configurable immediate values C1 and C2, when traversing the exemplary solution cache in FIG. 3, the processor 110 identifies that solutions S1, S2, and S3, have C1 and C2 as part of the corresponding keys, when traversing the solution cache 122.

For example, when determining if any of the existing solutions S1-S5 can be reused for the new CSP, the processor 110 traverses the tree in the solution cache 122 from the root node (in this case C1 320) and queries the value of the configurable immediate values, which are stored on the edge from the node. If the immediate value node has an edge having a value identical to the value in the test 132, the processor continues along that edge to reach the next node, which may be another immediate value node or a solution node. Alternatively, even if the immediate node has a NULL edge, the processor continues along the direction of that edge. When the processor reaches a leaf node, the processor uses any CSP solution that is stored at that leaf node as a solution for the CSP of the test 132.

Thus, if the processor 110 identifies a solution in the solution cache 122 that has a key with configurable immediate values identical to the configurable immediate values in the new test 132, the processor 110 uses the existing solution in the solution cache, without building a new CSP, or solving the new CSP, as shown at blocks 512 and 515. If the processor 110 is unable to find an identical key, the processor builds a CSP corresponding to the new test 132, as shown at block 522, determines the key for the CSP as described herein, as shown at block 524, and stores the CSP key and solution in the solution cache 122, as shown at block 526. Thus, the example of FIG. 3, Solution S1 can be used if C1=2 and C2=3; Solution S2 can be used if C1=5 and C2=4; Solution S3 can be used if C1=5. C2 is irrelevant; and Solutions S4, S5 can be used if C3=6, C1 is irrelevant.

Thus, the technical solutions described herein facilitate the testing system 100 to generate a CSP corresponding to the test 132 and find a solution to the CSP without heuristics and without solving the CSP, which is a time consuming and computationally expensive process. The testing system 100 selects a solution from the solution cache 122 based on the key of the solution matching the configurable immediate values in the test 132. The testing system 100 does not detect if the canonical forms of the new test 132 matches the canonical form of the test that its solution found in the solution cache, selected solution and the test 132 are identical or similar, rather only based on the key of the existing solution matching the configurable immediate values of the test, the testing system 100 selects the existing solution. Thus, the testing system 100 avoids extracting features and/or solving a CSP corresponding to the test 132. Accordingly, the testing system 100 infers whether the existing solution to a CSP satisfies the new CSP, which may be different from the previous CSP in the immediate values it uses, except for the key values stored in the previous CSP. In other words, the new CSP is different from the previous one, but this invention infers (having no heuristics) that the previous solution solves the new CSP.

Thus, the technical solutions facilitate a testing system to reuse a previous CSP solution without execution of heuristics by storing results of CSPs solutions (the solution cache) to be used later in other CSPs together with key immediate values for each respective solution. To determine the key immediate values of a CSP solution, the testing system iterates over all the constraints of the CSP. In each constraint, the testing system begins at the root of the constraint with positive polarity. For each node in the constraint, the testing system selects the children nodes that are to be checked recursively according to a type of an operation at the node and the polarity of that operation.

The testing system builds and maintains the solution cache as a tree in which internal nodes represent configurable immediate values, the edges between the nodes represent the values of the configurable immediate values, and the leaf nodes represent the CSP solutions. If an immediate value is irrelevant to the current solution, but was relevant in a previous CSP, the immediate value is part of the tree. In this case, a predetermined value, such as 'NULL' is associated with such an immediate value to represent that it is irrelevant to the current solution. The testing system may sort the nodes in the solution cache according to alphabetic order, such as based on names of the configurable immediate values.

Accordingly, in response to a request to find a solutions from the solution cache for a new CSP, the testing system traverses the cache tree from the root node and queries the value of the configurable immediate value whose name is in the node. If the immediate node has an edge having a value, the testing system continues to traverse the solution cache tree along the edge with the value. Alternatively, if the immediate value node has a NULL edge, the testing system continues to traverse in the direction of the NULL edge. If the immediate value node has both a NULL value and a real value, the testing system continues to traverse in both directions. If the traversal of the tree reaches a leaf node, the testing system uses a CSP solution stored at that leaf node as the solution of the new CSP.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for reusing a solution for a test, the method comprising:
    building, by a processor, a solution cache comprising a tree structure representative of a plurality of solutions, the tree structure comprising a key configurable immediate value of a previous solution as a node, the previous solution as a leaf node of the tree, and an edge from the node indicative of a value of the key configurable immediate value at the node;
    in response to receiving the test for which a solution is to be determined:
        identifying a constraint in the test that uses an immediate value, which is a symbol used in the constraint, and which is configured with a particular value at time of executing the test;
        determining that the immediate value was used for solving the previous solution;
        marking the immediate value as the key configurable immediate value based on the determination, without executing the test to generate a new solution for the test;
        traversing to a first node of the tree structure in the solution cache, the first node comprising the key configurable immediate value of the previous solution identical to a configurable immediate value from the test;
        identifying an edge of the tree structure from the first node, the edge being associated with a value identical to a value of the configurable immediate value from the test;
        traversing to a next node of the tree structure along the edge; and
        in response to the next node being a leaf node of the tree structure, using the solution at the leaf node as a solution of the test.

2. The computer implemented method of claim 1, further comprising:
    in response to the next node of the tree structure not being a leaf node:
        identifying the key configurable immediate value of the previous solution represented by the next node;
        determining the presence of a second configurable immediate value in the test, the second configurable immediate value identical to the key configurable immediate value at the next node; and
        in response to the second configurable immediate value being present, determining equality of a value of the second configurable immediate value in the test and a value associated with an edge from the next node; and
        in response to the values of the second configurable immediate value in the test and the key configurable immediate value at the next node being equal, traversing to a second next node along the edge from the next node.

3. The computer implemented method of claim 2, wherein in response to traversal of the tree structure not leading to a leaf node, determining the new solution for the test by executing the test and updating the tree structure in the solution cache by adding one or more new key configurable immediate values of the new solution to the tree structure.

4. The computer implemented method of claim 1, wherein the configurable immediate value is a constant value in a constraint of the test.

5. The computer implemented method of claim 1, further comprising selecting the key configurable immediate value of the previous solution.

6. The computer implemented method of claim 5, wherein selecting the key configurable immediate value of the previous solution further comprises:
    traversing nodes of a constraint tree structure from a root node of the constraint tree structure, wherein the constraint tree structure comprises at least one of an operator node, an immediate value node, and a variable node; and
    in response to a traversed node being the immediate value node that is representative of the configurable immediate value, selecting the configurable immediate value as the key configurable immediate value.

7. The computer implemented method of claim 5, wherein selecting the key configurable immediate value of the previous solution further comprises:
    parsing a constraint string to identify operators, variables, and immediate values in the constraint string; and
    building a constraint tree structure corresponding to the constraint string, the constraint tree structure comprises at least one of an operator node, an immediate value node, and a variable node.

8. A system for reusing a solution of a constraint satisfaction problem as a solution for a test, the system comprising:
    a memory configured to store a solution cache, wherein the solution cache comprises a tree structure representative of a plurality of solutions, the tree structure comprising intermediate nodes and leaf nodes, each intermediate node corresponding to a key configurable immediate value of a previous solution, and each leaf node corresponding respective previous solutions, and an edge from the intermediate node indicative of a value of the key configurable immediate value at the intermediate node;
    a processor identifying, from the previous solutions in the solution cache, a solution to be reused for the test, the processor being configured to:
        identify a constraint in the test that uses an immediate value, which is a symbol used in the constraint, and which is configured with a particular value at time of executing the test;
        determine that the immediate value was used for solving the previous solution; and
        mark the immediate value as the key configurable immediate value of the previous solution based on the determination, without executing the test to generate a new solution for the test;
        traverse to a first intermediate node of the tree structure in the solution cache, the key configurable immediate value of the previous solution at the first intermediate node identical to a first configurable immediate value from the test;
        identify an edge of the tree structure from the first intermediate node, the edge being associated with a value identical to a value of the first configurable immediate value from the configurable immediate values in the test;
        traverse to a next node of the tree structure along the edge; and
        in response to the next node being a leaf node of the tree structure, reuse the previous solution at the leaf node as a solution of the test.

9. The system of claim 8, wherein the processor is further configured to:
    in response to the next node of the tree structure being a second intermediate node:
        identify the key configurable immediate value of the previous solution represented by the second intermediate node;
        determine the presence of a second key configurable immediate value in the test, the second configurable immediate value being identical to the key configurable immediate value in the second intermediate node; and
        in response to the second configurable immediate value being present, and a value of the second configurable immediate value in the test being equal to a value associated with an edge from the second intermediate node, traverse to a third node along the edge from the second intermediate node.

10. The system of claim 8, wherein the processor is further configured to:
    in response to traversal of the tree structure not leading to a leaf node of the tree structure:
        determine the new solution for the test by executing the test; and
        update the tree structure in the solution cache based on one or more new key configurable immediate values of the new solution.

11. The system of claim 8, wherein the configurable immediate value is a constant value in a constraint of the test.

12. The system of claim 8, wherein the processor is further configured to select the key configurable immediate value of each respective previous solution in the solution cache.

13. The system of claim 12, wherein selection of the key configurable immediate value of the each respective previous solution further comprises:
    traversal of nodes of a constraint tree structure from a root node of the constraint tree structure, wherein the constraint tree structure comprises at least one of an operator node, an immediate value node, and a variable node; and
    in response to a traversed node being the immediate value node representative of the configurable immediate value, selection of the configurable immediate value as the key configurable immediate value.

14. The system of claim 12, wherein selection of the key configurable immediate value of the each respective previous solution further comprises:
    parsing of a constraint string to identify operators, variables, and immediate values in the constraint string; and
    generation of a constraint tree structure corresponding to the constraint string, the constraint tree structure comprises at least one of an operator node, an immediate value node, and a variable node.

15. A computer program product for reusing a solution from a solution cache, the computer product comprising computer readable storage medium, the computer readable storage medium comprising computer executable instructions, wherein the computer readable storage medium comprises instructions to:
  build a solution cache, wherein the solution cache comprises a tree structure representative of a plurality of solutions, the tree structure comprising intermediate nodes and leaf nodes, each intermediate node corresponding to a key configurable immediate value of a previous solution, and each leaf node corresponding respective previous solutions, and an edge from the intermediate node indicative of a value of the key configurable immediate value at the intermediate node;
  in response to receipt of a test for which a solution is to be determined:
    identify a constraint in the test that uses an immediate value, which is a symbol used in the constraint, and which is configured with a particular value at time of executing the test;
    determine that the immediate value was used for solving the previous solution;
    mark the immediate value as the key configurable immediate value based on the determination, without executing the test to generate a new solution for the test;
    traverse to a first node of the tree structure in the solution cache, the key configurable immediate value of the previous solution at a first intermediate node identical to a first configurable immediate value from the test;
    identify an edge of the tree structure from the first intermediate node, the edge being associated with a value identical to a value of the first configurable immediate value from the test;
    traverse to a next node of the tree structure along the edge; and
    in response to the next node being a leaf node of the tree structure, reuse the previous solution at the leaf node as a solution of the test.

16. The computer program product of claim 15, wherein the computer readable storage medium further comprises instructions to:
  in response to the next node of the tree structure being a second intermediate node:
    identify the key configurable immediate value of the previous solution represented by the second intermediate node;
    determine the presence of a second configurable immediate value in the test, the second configurable immediate value being identical to the key configurable immediate value in the second intermediate node; and
    in response to the second configurable immediate value being present, and a value of the second configurable immediate value in the test being equal to a value associated with an edge from the second intermediate node, traverse to a third node along the edge from the second intermediate node.

17. The computer program product of claim 15, wherein the computer readable storage medium further comprises instructions to:
  in response to traversal of the tree structure not leading to a leaf node of the tree structure:
    determine the new solution for the test; and
    update the tree structure in the solution cache based on one or more new key configurable immediate values of the new solution.

18. The computer program product of claim 15, wherein the computer readable storage medium further comprises instructions to select the key configurable immediate value of each respective previous solution in the solution cache.

19. The computer program product of claim 18, wherein selection of the key configurable immediate value of the each respective previous solution further comprises:
  traversal of nodes of a constraint tree structure from a root node of the constraint tree structure, wherein the constraint tree structure comprises at least one of an operator node, an immediate value node, and a variable node; and
  in response to a traversed node being an immediate value node, wherein the immediate value node is representative of a configurable immediate value, selection of the configurable immediate value as the key configurable immediate value.

20. The computer program product of claim 18, wherein selection of the key configurable immediate value of the each respective previous solution further comprises:
  parsing of a constraint string to identify operators, variables, and immediate values in the constraint string; and
  generation of a constraint tree structure corresponding to the constraint string, the constraint tree structure comprises at least one of an operator node, an immediate value node, and a variable node.

* * * * *